United States Patent [19]

Bastiaans

[11] 3,768,716

[45] Oct. 30, 1973

[54] ENDLESS LOOP TAPE CASSETTE

[75] Inventor: Cedric R. Bastiaans, Verona, Pa.

[73] Assignee: Westinghouse Electric Corporation, Pittsburgh, Pa.

[22] Filed: May 18, 1972

[21] Appl. No.: 254,692

[52] U.S. Cl................... 226/113, 226/118, 226/189, 226/195, 226/191

[51] Int. Cl............................................. B65h 17/20

[58] Field of Search.................... 226/118, 113, 114, 226/189, 195, 119, 191, 175; 274/4 B, 11 B, 4 D, 11 D; 179/100.2 Z; 352/78

[56] References Cited

UNITED STATES PATENTS

| | | | |
|---|---|---|---|
| 1,607,740 | 11/1926 | Griffiths | 226/119 X |
| 1,896,928 | 2/1933 | White | 226/119 X |
| 3,306,510 | 2/1967 | Brumbaugh | 226/118 |
| 3,380,678 | 4/1968 | Feasey | 226/189 UX |
| 3,490,671 | 1/1970 | HLadky | 226/189 X |

*Primary Examiner*—Richard A. Schacher
*Attorney*—F. H. Henson et al.

[57] ABSTRACT

Described is an endless loop magnetic tape cassette designed for tape speeds as high as 120 inches per second or higher, and capable of delivering either short messages which repeat, or capable of a continuous test signal.

8 Claims, 11 Drawing Figures

ENDLESS LOOP TAPE CASSETTE

BACKGROUND OF THE INVENTION

As is known, the usual miniature magnetic tape cassette comprises an outer casing containing spaced tape reels, a magnetic tape extending from one reel to the other, guiding means for the tape in passing from one reel to the other, and means for accommodating a driving capstan for the tape. As will be appreciated, the tape in this type of cassette must be paid off one reel and wound upon the other, meaing that there is a finite time during which the tape can be played before it is rewound onto the take-off reel or turned over so that the other of two sound tracks can be played or recorded.

The tapes of certain cassettes of this type have recorded thereon test signals, usually a tone of a specified frequency, which is used for alignment procedures and the like. Normally, a test signal is recorded at a tape speed of 1⅞ inches per second, and the length of the tape in the cassette is such that the test signal rarely persists for longer than about two minutes. There has arisen, however, a need for tape dubbing systems wherein the speed of the tape is increased to 120 inches per second or higher as described in copending application Ser. No. 254,694, filed May 18, 1972. At such high dubbing speeds, the test signal on a conventional cassette arrangement would persist no longer than two seconds, much too short a time to do any testing at all.

Prior to this time, there have been no test tapes available capable of operating at a tape speed of 120 inches per second. Additionally, there is a need for an endless loop tape cassette, operable at the normal tape speed of about 1⅞ inches per second, which can be used for short duration messages, either continuously repeating or started at will and automatically stopped after one or more complete revolutions of the tape loop.

Endless loop tape cassettes have been provided which are, in effect, cassette variations of the well known four- and eight-track cartridge principles, where tape is pulled out of the center of a tape reel and fed back onto the periphery of the same reel again. An arrangement of this type, however, requires a heavily lubricated tape and high tape speeds are not possible.

SUMMARY OF THE INVENTION

In accordance with the present invention, an endless loop tape cassette is provided which can be used at normal playback tape speeds for short duration messages and which at the same time can be used to provide a test signal at a tape speed of 120 inches per second or higher.

Specifically, there is provided an endless loop cassette assembly comprising an outer casing containing spaced tape hubs, means within the casing for guiding a tape past a pickup head and a driving capstan, a single endless length of magnetic tape passing round the hubs and past said pickup head and capstan without being wound around either of said hubs, and means for maintaining the tape taut. In certain cases, one of the hubs is braked while the other hub is free to rotate.

In the preferred embodiment of the invention, an idler roller is inserted into the casing through an opening, the capstan being external to the casing and urged into engagement with the side of the tape opposite the idler roller. The means for maintaining the tape taut within the cassette can take various forms, including a tension roller disposed between the tape hubs or radially resilient hubs which automatically take up any slack in the tape.

The above and other objects and features of the invention will become apparent from the following detailed description taken in connection with the accompanying drawings which form a part of this specification, and in which.

Figure 1:
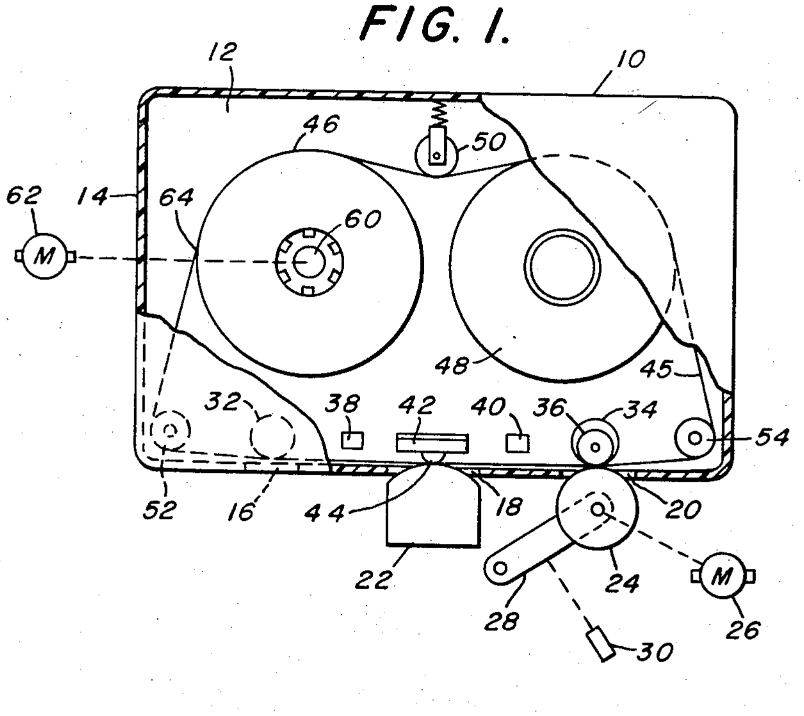
FIG. 1 is a partially broken-away top view of a tape cassette in accordance with the invention.

With reference now to the drawings, and particularly to FIG. 1, there is shown a tape cassette typically about 4 inches long and 2½ inches wide which carries a tape having a width of about ⅛ inch. It comprises an outer casing having upper and lower walls 10 and 12 interconnected and spaced apart by side walls 14. In the usual case, the casing is formed from upper and lower mating halves connected along a seam midway between the tops and bottoms of the side walls 14. Formed in the forward side wall are openings 16, 18 and 20. The middle opening 18 is adapted to receive a recording or playback head 22; while the opening 16 or 20, depending upon which track of the tape is being played, receives a driven capstan 24. As shown, the capstan 24 is driven by means of drive motor 26 and is mounted on a pivotal arm 28 adapted to be rotated to move the capstan 24 into or out of the opening 20 by means of a solenoid 30.

Formed in the cassette are two openings 32 and 34 adapted to receive an idler roller 36 which, in the usual case, is provided with a rubber or other resilient surface. Openings 38 and 40 are provided in the cassette for the purpose of aligning it with positioning pins projecting upwardly from a tape deck in accordance with the usual procedure. The idler roller 36 also projects upwardly from a tape deck as will be understood. Between the openings 38 and 40 is a leaf spring 42 which carries a pressure pad 44 acting to force a continuous length of magnetic tape against the pickup head 22.

Carried within the cassette are two tape hubs 46 and 48. The continuous length of magnetic tape 45 passes around the hub 48, thence past a spring-loaded idler roller 50, then around hub 46, and finally around idler rollers 52 and 54 at the opposite front corners of the cassette. In passing from the idler roller 52 to roller 54, the tape first passes between the pressure pad 44 and the pickup head 22, and thence between the idler roller 36 and the driving capstan 24. The speed of the tape is determined by the speed of the capstan 24. The idler rollers 52 and 54 are preferably of the hourglass type such as that shown in copending application Ser. No. 254,691, filed May 18, 1972.

Figure 2:
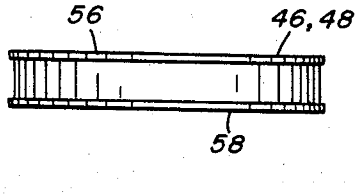
FIG. 2 is a side elevational view of the tape hubs shown in the device of FIG. 1.

An elevational edge view of the tape hub 46 is shown in FIG. 2; and it will be noted that it is provided with upper and lower flanges 56 and 58 spaced apart in an amount equal to the width of the tape 45 so as to prevent the tape from slipping off the hub. The peripheral tape engaging surface 55 is preferably formed from high friction material such as rubber. Hub 48 is also provided with similar flanges.

In one embodiment of the invention, the hubs 46 and 48 are free to rotate about their centers while the tape is driven between the roller 36 and capstan 24. With this arrangement, the spring-loaded roller 50 maintains the tape taut. In other embodiments, it may be desirable to have the left-hand hub 46 engage, through a splined spindle 60 a braking device 62, present on most tape decks, so as to operate with increased tape tension between the take-off point 64 of hub 46 and the drive point between elements 36 and 24. With the arrangement shown, and assuming that the tape has a test signal recorded thereon, it can be driven at a continuous speed as high as 120 inches per second or higher and used for alignment purposes and the like in high speed tape dubbing systems such as that shown in copending application Ser. No. 254,694, filed May 18, 1972. Alternatively, a short message can be recorded on the tape which is then driven at the normal recording speed of about 1⅞ inches per second whereby the message is continually or selectively repeated.

Figure 3:
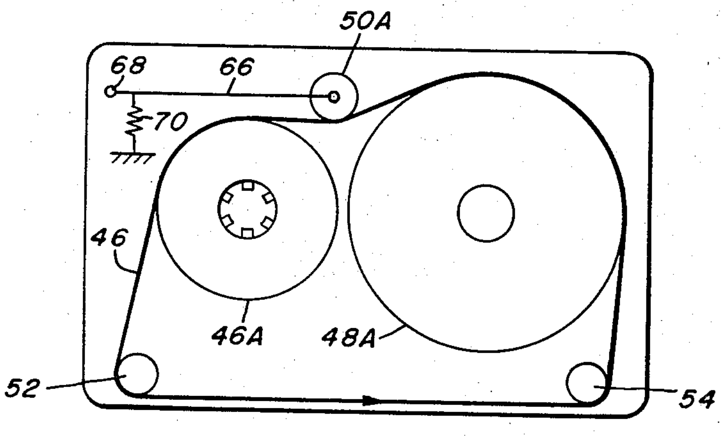
FIG. 3 is a diagrammatic illustration of a variation of the tape cassette shown in FIG. 1.

A variation of the arrangement of FIG. 1 is illustrated in FIG. 3 wherein the left-hand hub 46A is of smaller diameter than the right-hand hub 48A. The tape 45 again passes around the hubs 46A, 48A and guide rollers 52 and 54 at the corners of the cassette adjacent the capstan and pickup head, neither of which are shown in FIG. 3 for purposes of simplicity. The smaller diameter of hub 46A enables a spring-loaded roller 50A to be mounted on a cantilever arm 66 located above the hub 46A and pivotally connected to the upper and/or lower walls 10 and 12 of the cassette at point 68. A tension spring 70 urges the cantilever arm 66 to rotate in a clockwise direction as viewed in FIG. 3, thereby exerting tension via roller 50A on the tape between the hubs 46A and 48A. As will be appreciated, a similar arrangement could be used with the cantilever arm extending in the opposite direction, in which case the hub 48A would have to be smaller in diameter than hub 46A.

Figure 4A:
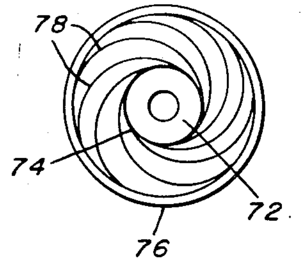
FIGS. 4A–4D illustrate the manner in which radially resilient hubs can be utilized in the invention.
Figure 4B:
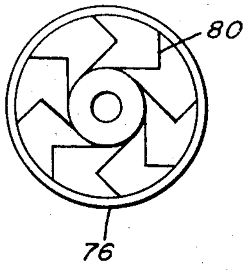
Figure 4C:
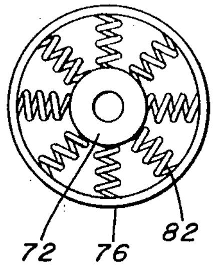
Figure 4D:
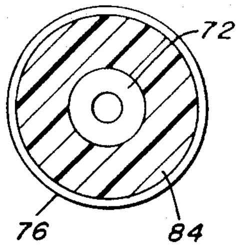

Instead of using a spring-loaded roller 50 to maintain the tape taut, it is also possible to utilize radially resilient hubs, such as those shown in FIGS. 4A–4D. By radially resilient, it is meant that the hub can move inwardly or outwardly with respect to a central axis. As shown in FIG. 4A, the central circular portion of the hub 72 is mounted on a stationary spindle 74 extending upwardly from a tape deck. Between the hub 72 and an outer annular rim 76 is a plurality of leaf springs 78 which permit one side of the rim 76 to move inwardly toward the hub 72 while the other side moves outwardly. A similar arrangement is shown in FIG. 4B wherein elements corresponding to those of FIG. 4A are identified by like reference numerals. In this case, however, the leaf springs 80 are of a different configuration, being connected to the hub 72 and bent intermediate their connection to the hub and the other rim 76. In FIG. 4C, still another embodiment of a radially resilient hub is shown wherein the inner hub 72 is connected to an outer rim 76 by means of radially-extending coil springs 82. Finally, in FIG. 4D, still another embodiment is shown wherein soft-foam rubber 84 or the like is interposed between an inner hub 72 and an outer rim 76.

Figure 5:
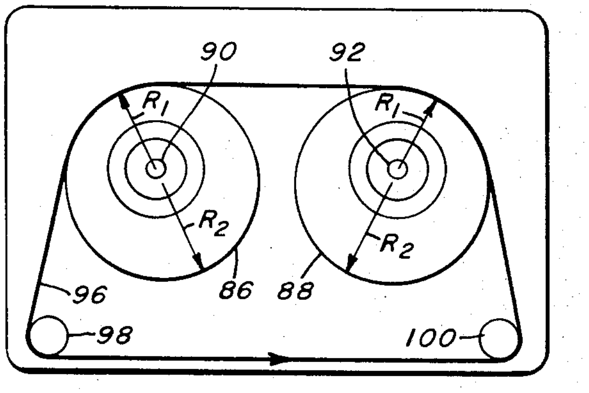
FIG. 5 is a diagrammatic illustration of a cassette employing radially resilient hubs, such as those illustrated in FIGS. 4A–4D.

A typical embodiment of the invention utilizing the radially resilient hubs of FIGS. 4A–4D is diagrammatically illustrated in FIG. 5. It comprises two radially resilient hubs 86 and 88, both rotatable about fixed spindles 90 and 92 carried within a tape cassette 94. A continuous length of tape 96 passes around the hubs 86 and 88 and thence around idler rollers 98 and 100 at the forward corners of the cassette. Again, the pickup head and driving capstan are not shown in the diagrammatic illustration of FIG. 5 for purposes of simplicity.

With an arrangement such as that shown in FIG. 5, the outer rims 76 of the hubs 86 and 88 will always be off-center with respect to the spindles 90 and 92 about which they rotate. That is, the radii $R_1$ on one side of the spindles 90 and 92 will be less than the radii $R_2$ on the other side. The radially-extending springs, however, act to constantly maintain tension in the continuous tape loop 96.

Figure 6:
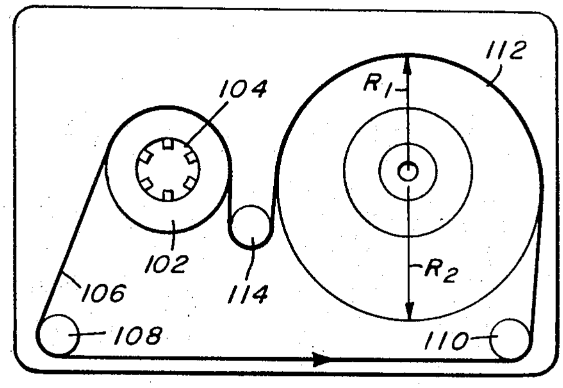
FIGS. 6 and 7 are diagrammatic illustrations of an endless loop tape cassette employing a resilient hub for the purpose of maintaining tension in the tape.
Figure 7:
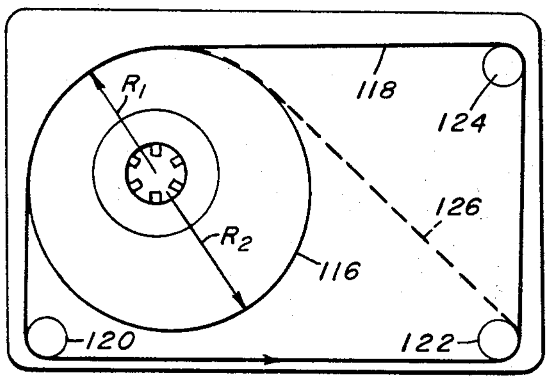

In FIGS. 6 and 7, other embodiments of the invention utilizing a radially resilient hub are shown. In FIG. 6, the left-hand hub 102 is not radially expandable (similar to that shown in FIG. 1) and is provided with ribs 104 which can engage a splined spindle connected to a braking motor or the like. A continuous loop of magnetic tape 106 passes around hub 102, thence around idler rollers 108 and 110 (corresponding to rollers 52 and 54 of FIG. 1), then around a radially-expandable hub 112, such as that shown in FIGS. 4A–4D, and finally around a fixed idler roller 114 back to the hub 104. Again, tension is maintained in the tape by virtue of the resilient loading of the outer rim of hub 112, corresponding to rim 76 shown in FIGS. 4A–4D.

In FIG. 7, an embodiment of the invention is shown which utilizes a single radially-expandable hub 116. The continuous length of tape 118 passes around hub 116 and thence around three idler rollers 120, 122 and 124 back to the hub 116. In certain cases, the tape can be made to pass around idler roller 122 directly back to the hub 116 as shown by the dotted line 126. As will be understood, however, this materially reduces the length of the tape within the cassette.

Figure 8:
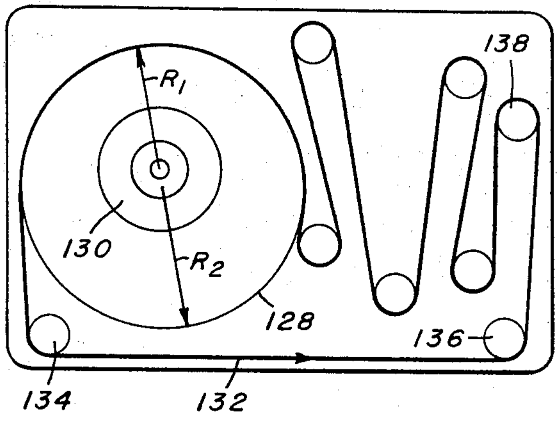
FIG. 8 is a diagrammatic illustration of still another embodiment of the invention employing a resilient hub and capable of playing tapes of longer length than those shown in the foregoing embodiments.

Finally, an embodiment of the invention is shown in FIG. 8 which again employs a single radially resilient hub 128 rotatable about a fixed spindle 130. In this case, a continuous length of magnetic tape 132 passes around idler rollers 134 and 136 at the two forward corners of the cassette, and thence around a plurality of idler rollers 138 located to the right of the hub 128. Again, idler rollers 138 are of the hourglass type. As will be appreciated, this causes the tape 132 to follow a serpentine back-and-forth path and materially increases the length of the tape which can be carried within the cassette. Again, the driving capstan and pickup head are not shown for purposes of simplicity in the embodiments of FIGS. 6–8.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. An endless loop magnetic tape cassette assembly comprising:

an outer casing containing spaced tape hubs;

means within said casing for guiding a tape past a pickup head and a driving capstan;

a continuous length of magnetic tape passing around said hubs, said guiding means and past said pickup head and capstan without being wound around either of said tape hubs; and means for maintaining said tape taut as it passes around said hubs.

2. The assembly of claim 1 including means for braking one of said hubs while the other hub is free to rotate.

3. The cassette assembly of claim 1 including an idler roller insertable into said casing through a hole therein, the capstan being external to the casing, and means for urging said capstan into engagement with the side of the tape opposite said idler roller.

4. The assembly of claim 1 wherein said means for maintaining said tape taut comprises a spring-loaded idler roller engaging said tape between said hubs, said spring-loaded roller being urged against the tape between the hubs.

5. The assembly of claim 1 wherein said means for maintaining said tape taut comprises an idler roller between said hubs, a cantilever arm pivotally connected at one end to said cassette and at its other end to said idler roller, and spring means urging said cantilever arm and said idler roller into engagement with said tape.

6. An endless loop magnetic tape cassette assembly comprising:

an outer casing containing spaced tape hubs, at least one of said hubs being provided with a central hub portion, an outer rim portion, and resilient means interconnecting said rim portion and said hub portion whereby the resilient means will exert a radial force against said rim portion;

means within said casing for guiding a tape past a pickup head and a driving capstan; and a continuous length of magnetic tape passing around said hubs, said guiding means and past said pickup head and capstan without being wound around either of said tape hubs, the resilient means interconnecting said rim portion and said hub portion acting to maintain said tape taut as it passes around said one hub.

7. The assembly of claim 6 wherein one of said hubs is radially resilient while the other is not.

8. The assembly of claim 6 wherein both of said tape hubs are radially resilient.

* * * * *